United States Patent
Burkman et al.

(10) Patent No.: US 10,476,262 B2
(45) Date of Patent: Nov. 12, 2019

(54) DUAL-BUS BATTERY PRECHARGE CIRCUIT

(71) Applicant: FORD GLOBAL TECHNOLOGIES, LLC, Dearborn, MI (US)

(72) Inventors: Wesley Edward Burkman, Dearborn, MI (US); John Sturza, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/469,012

(22) Filed: Mar. 24, 2017

(65) Prior Publication Data

US 2018/0272870 A1   Sep. 27, 2018

(51) Int. Cl.
  *B60L 9/00* (2019.01)
  *H02H 9/00* (2006.01)
  *B60L 3/00* (2019.01)

(52) U.S. Cl.
  CPC ........... *H02H 9/005* (2013.01); *B60L 3/0069* (2013.01); *B60L 3/0092* (2013.01); *H02H 9/001* (2013.01); *B60L 2270/20* (2013.01); *Y02T 10/7005* (2013.01); *Y02T 10/92* (2013.01); *Y02T 90/14* (2013.01)

(58) Field of Classification Search
  CPC ...... H02H 9/005; B60L 3/0069; B60L 3/0092
  See application file for complete search history.

(56) References Cited

U.S. PATENT DOCUMENTS

| | | |
|---|---|---|
| 8,513,953 B2 | 8/2013 | Myoen et al. |
| 8,901,934 B2 | 12/2014 | Namou et al. |
| 2015/0191088 A1* | 7/2015 | Gonzales ............. G07C 5/0808 701/34.2 |
| 2015/0251542 A1* | 9/2015 | Mensah-Brown .... B60L 11/005 307/10.1 |
| 2015/0255975 A1 | 9/2015 | Siciak et al. |
| 2018/0134160 A1* | 5/2018 | Kratzer ..................... B60L 3/04 |

* cited by examiner

*Primary Examiner* — Adam M Alharbi
(74) *Attorney, Agent, or Firm* — David Kelley; Brooks Kushman P.C.

(57) ABSTRACT

A power control system for a vehicle includes a precharge circuit that is configured to selectively couple a resistor across either a main or return contactor that are configured to selectively couple terminals of a battery to a load bus. The power control system includes a controller programmed to, in response to a precharge request in a presence of the main contactor being closed when commanded to open and the return contactor being open, couple the resistor across the return contactor to precharge the load bus.

18 Claims, 4 Drawing Sheets

DUAL-BUS BATTERY PRECHARGE CIRCUIT

TECHNICAL FIELD

This application generally relates to a precharge circuit between a traction battery and high-voltage electrical components in a vehicle.

BACKGROUND

Electrified vehicles include high-voltage components that are connected to a high-voltage bus. Electrified vehicles also include a high-voltage battery that is connected to the high-voltage bus to provide power to the high-voltage components. When the vehicle is not in an operating mode, the high-voltage battery is disconnected from the high-voltage bus. One or more main contactors may be electrically disposed between the high-voltage bus and the high-voltage battery. The main contactors are controlled to couple and decouple the high-voltage battery and the high-voltage bus. Large inrush currents may result when coupling the high-voltage battery to the high-voltage bus.

SUMMARY

A vehicle includes a precharge circuit configured to selectively couple a resistor across either a first or second contactor that are configured to selectively couple terminals of a battery to a load bus. The vehicle further includes a controller programmed to, in response to a precharge request in a presence of the first contactor being closed when commanded to open and the second contactor being open, couple the resistor across the second contactor to precharge the load bus.

The controller may be further programmed to, in response to the precharge request in a presence of the first contactor being open and the second contactor being closed when commanded to open, couple the resistor across the first contactor to precharge the load bus. The controller may be further programmed to, in response to the precharge request in a presence of both the first contactor and the second contactor being open and following an immediately preceding precharge request that resulted in coupling the resistor across the first contactor, couple the resistor across the second contactor to precharge the load bus. The controller may be further programmed to, in response to the precharge request in a presence of both the first contactor and the second contactor being open and following an immediately preceding precharge request that resulted in coupling the resistor across the second contactor, couple the resistor across the first contactor to precharge the load bus.

A method includes coupling a resistor across a first contactor coupled between negative terminals of a battery and a load bus in response to a precharge request and a second contactor, coupled between positive terminals of the battery and the load bus, being shorted closed when commanded to open. The method further includes coupling the resistor across the second contactor in response to the precharge request and the second contactor being open.

Coupling the resistor across the second contactor may be further in response to the precharge request following an immediately preceding precharge request that resulted in coupling the resistor across the first contactor. The method may further include coupling the resistor across the second contactor in response to the precharge request and the first contactor being shorted closed when commanded to open. The method may further include coupling the resistor across the first contactor in response to both the first contactor and the second contactor being open and the precharge request following an immediately preceding precharge request that resulted in coupling the resistor across the second contactor.

A vehicle includes a precharge circuit configured to selectively couple a resistor across either a first or second contactor that are configured to selectively couple terminals of a battery to a load bus. The vehicle further includes a controller programmed to, in response to a precharge request that follows an immediately preceding precharge request that resulted in coupling the resistor across the first contactor, couple the resistor across the second contactor to precharge the load bus.

The controller may be further programmed to, in response to the precharge request that follows the immediately preceding precharge request that resulted in coupling the resistor across the first contactor and the second contactor being closed when commanded to open, couple the resistor across the first contactor. The controller may be further programmed to, in response to the precharge request that follows the immediately preceding precharge request that resulted in coupling the resistor across the second contactor, couple the resistor across the first contactor to precharge the load bus. The controller may be further programmed to, in response to the precharge request that follows the immediately preceding precharge request that resulted in coupling the resistor across the second contactor and the first contactor being closed when commanded to open, couple the resistor across the second contactor.

The precharge circuit may include a first switching device configured to selectively couple the resistor between a positive terminal of the battery and a positive terminal of the load bus, and a second switching device configured to selectively couple the resistor between a negative terminal of the battery and a negative terminal of the load bus. The first switching device may be a p-channel metal oxide semiconductor field-effect transistor (MOSFET) and the second switching device may be an n-channel MOSFET. The precharge circuit may further include a first diode coupled between the resistor and the positive terminal of the load bus and configured to flow current when the first switching device selectively couples the resistor, and a second diode coupled between the resistor and the negative terminal of the load bus and configured to flow current when the second switching device selectively couples the resistor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
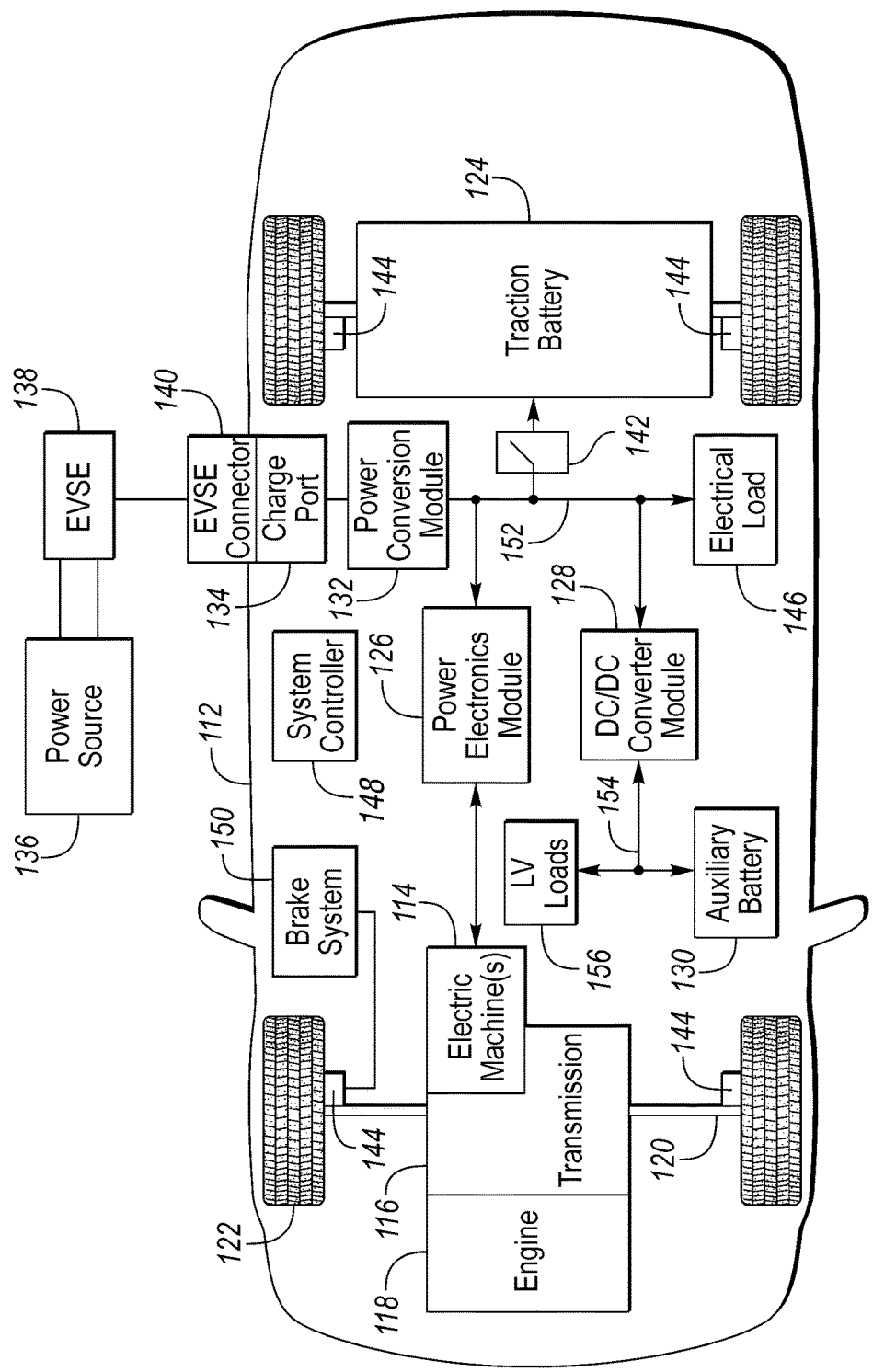
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability. In other configurations, the vehicle 112 may be a fuel-cell electric vehicle (FCEV).

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus or load bus 152 when opened and connect the traction battery 124 to the high-voltage load bus 152 when closed. The high-voltage load bus 152 may include power and return conductors for carrying current over the high-voltage load bus 152. The contactor module 142 may be located in the traction battery 124. One or more power electronics modules 126 (also known as an inverter) may be electrically coupled to the high-voltage load bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage load bus 152 to a low-voltage DC level of a low-voltage load bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage load bus 154. One or more high-voltage electrical loads 146 may be coupled to the high-voltage load bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage load bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic modules that are present in the vehicle 112. A vehicle system controller (VSC) 148 may be present to coordinate the operation of the various components.

Figure 2:
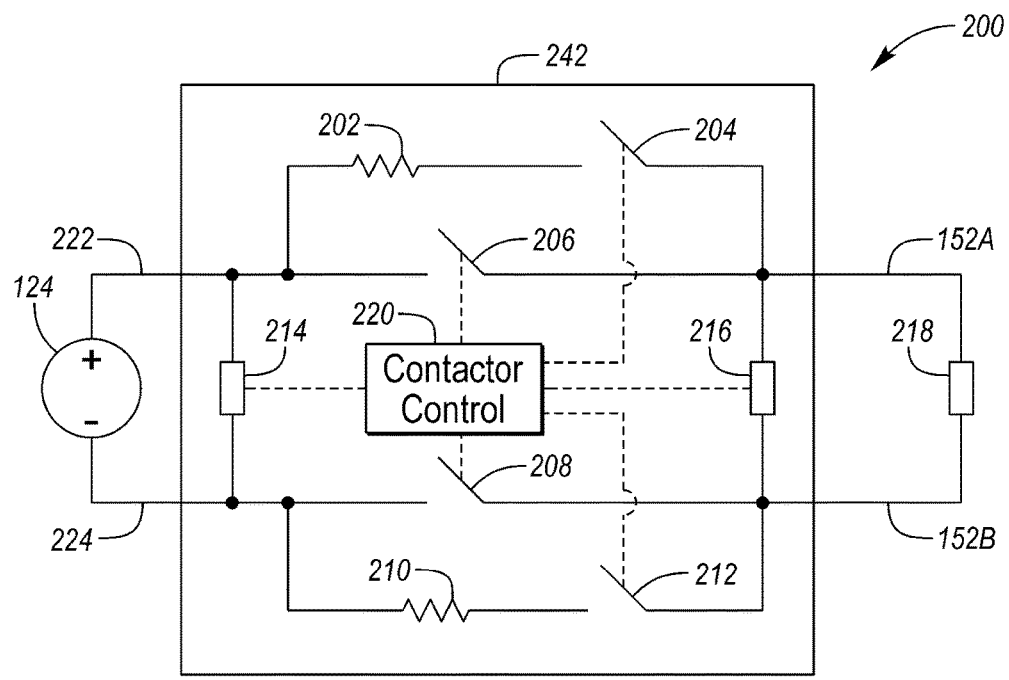
FIG. 2 depicts a possible configuration for a vehicle high-voltage system having a precharge resistor for each bus contactor.

FIG. 2 depicts a configuration of a high-voltage power distribution system 200 for a vehicle including a plurality of contactors for coupling the traction battery 124 to high-voltage electrical loads 218. A contactor module 242 may include a positive-side precharge switch 204 that is electrically coupled in series with a positive-side precharge resistor 202. The contactor module 242 may include a main contactor 206 that is configured to selectively electrically couple a positive terminal 222 of the traction battery 124 to a positive-side conductor 152A of the high-voltage load bus 152. The circuit path including the positive-side precharge switch 204 and the positive-side precharge resistor 202 may be coupled between the positive terminal 222 and the positive-side conductor 152A in parallel with the main contactor 206.

The contactor module 242 may include a return contactor 208 that is configured to selectively electrically couple a traction battery return terminal 224 (return terminal of the traction battery 124) to a return-side conductor 152B of the high-voltage load bus 152. The contactor module 242 may include a return-side precharge switch 212 that is electrically coupled in series with a return-side precharge resistor 210. The circuit path including the return-side precharge switch 212 and the return-side precharge resistor 210 may be coupled between the return terminal 224 and the return-side conductor 152B in parallel with the return contactor 208. The positive-side precharge resistor 202 and the return-side precharge resistor 210 may be configured to limit the current flowing through the high-voltage load bus 152 during startup when the traction battery 124 is initially connected to the high-voltage load bus 152.

The contactors (e.g., 206 and 208) and the switches (e.g., 204 and 212) may be electromagnetic switches such as a relay. The electromagnetic switches may include a coil which opens or closes an associated switch when energized. For example, the contactors and switches may be normally-open devices such that the circuit path is opened when the coil is de-energized and closed when the coil is energized. A coil may be energized by applying a voltage across the coil to cause current to flow in the coil. The coils may be electrically coupled to a contactor controller 220 that is configured to provide voltage and current to the coils. In some configurations, the contactors and switches may be solid-state devices such as an Insulated Gate Bipolar Transistor (IGBT) or similar devices. The contactor controller 220 may be configured to drive the coils and/or solid-state devices using hardware components and software functions. In some configurations, the contactor controller 220 may be integrated with another controller in the vehicle (e.g., system controller 148).

The electrical loads 218 may include capacitive elements that have not been charged. For example, a capacitor may be coupled across the terminals of the high-voltage load bus 152 to smooth the voltage. A precharge operation may be performed when coupling electrical loads 218 to the high-voltage load bus 152. The purpose of the precharge operation is to limit the large initial current flow (e.g., inrush current) that can occur when switching a voltage to the capacitive loads. The precharge operation protects the main contactor 206 and the return contactor 208 from excessive inrush currents. Without a precharge operation, the main contactor 206 and the return contactor 208 would be closed and subject to the full inrush current. As a result, as the main contactor 206 and the return contactor 208 are closing, arcing may occur as the contactors are closed. This arcing may have adverse effects on the contactors. For example, excessive inrush currents may cause a contactor to become welded in the closed position. The precharge operation is performed to reduce the occurrence of such events. In addition, arcing and welding may occur when the contactor is commanded to open while current is flowing. Normal shut-down procedures may check that current is below a threshold before opening the contactors.

The precharge cycle may be performed when the traction battery 124 is decoupled from the high-voltage load bus for longer than a predetermined time. The precharge cycle may be performed when the voltage of the high-voltage load bus 152 is below the traction battery voltage by an amount greater than a predetermined amount. The precharge operation may be initiated when the contactors (e.g., 206 and 208) are open during an immediately preceding time interval. The precharge operation may also be initiated upon vehicle power-up or key-on.

At system power-up, all of the contactors may be in an opened state. That is, the traction battery 124 is decoupled or isolated from the high-voltage load bus 152. The precharge operation may include closing one or more of the positive-side precharge switch 204 and the return-side precharge switch 212 before closing the main contactor 206 and the return contactor 208. Closing the positive-side precharge switch 204 couples the positive-side precharge resistor 202 in the conductive path between the traction battery 124 and the high-voltage load bus 152. The positive-side precharge resistor 202 limits the current flow from the traction battery 124 to the electrical loads 218.

The precharge operation may be performed by closing the positive-side precharge switch 204 and the return contactor 208. Upon completion of the precharge operation, the main contactor 206 may be closed and the positive-side precharge switch 204 may be opened. The precharge operation may also be performed by closing the main contactor 206 and the return-side precharge switch 212. Upon completion of the precharge operation, the return contactor 208 may be closed and the return-side precharge switch 212 may be opened. After the precharge is completed, the main contactor 206 and the return contactor 208 may be maintained in the closed position.

The contactor module 242 may include a contactor controller 220 that is configured to operate and sequence the contactors and switches. Although depicted as part of the contactor module 242, the contactor controller 220 may be part of an external controller (e.g., system controller 148 or a traction battery controller). The contactor controller 220 may include a processor and memory including volatile and non-volatile memory. The contactor controller 220 may include hardware to interface with the contactors and switches. For example, the contactor controller 220 may include outputs that are configured to provide a voltage and current to contactor coils to energize the contactors.

The contactor module 242 may include a battery-side voltage sensing device 214 that is coupled between the terminals of the traction battery 124. The contactor module 242 may include a load-side voltage sensing device 216 that is coupled between the terminals of the high-voltage load bus 152. For example, the voltage sensing devices may be a resistive network that scales the voltage levels to be compatible with the contactor controller 220. The voltage sensing devices 214, 216 may also include circuitry for filtering the voltage signals and isolating the contactor controller 220 from high voltages. The contactor controller 220 may receive a signal from the battery-side voltage sensing device 214 that is indicative of the traction battery voltage. The contactor controller 220 may receive a signal from the load-side voltage sensing device 216 that is indicative of the high-voltage load bus voltage.

The precharge operation may be completed when the difference between the traction battery voltage and the high-voltage load bus voltage is less than a predetermined threshold. The precharge operation may be complete when the high-voltage load bus voltage is within a predetermined range of the traction battery voltage (e.g., within 20V). The precharge operation may be completed after a predetermined time interval has expired from initiation of the precharge operation. The contactor controller 220 may monitor the voltages and time intervals to determine that the precharge operation is complete.

The configurations described herein are robust to conditions in which either one of main contactor 206 or the return contactor 208 are welded in a closed state. When one of the main contactor 206 or the return contactor 208 are permanently closed, it is still possible to perform the precharge operation across the other contactor. For example, if the main contactor 206 is welded in the closed state, the precharge operation can be performed using the precharge circuit (e.g., the return-side precharge resistor 210 and the return-side precharge switch 212) across the return contactor 208. As a result, the traction battery 124 may be coupled to the electrical loads 218 without excessive currents flowing through the return contactor 208.

Figure 3:
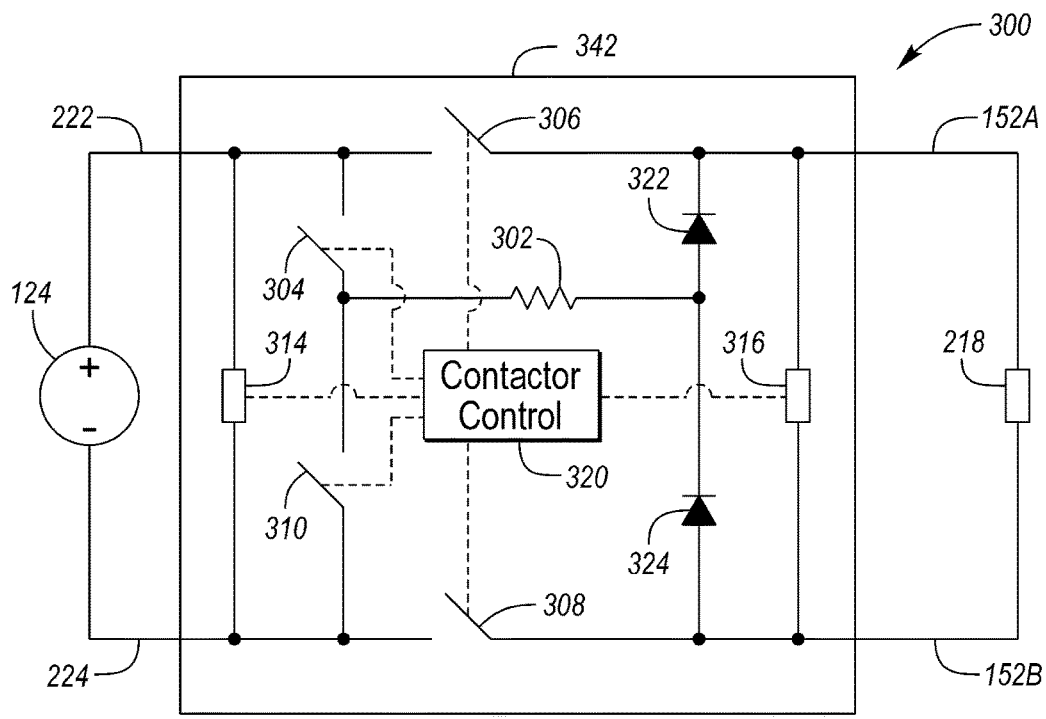
FIG. 3 depicts a possible configuration for a vehicle high-voltage system having a single resistor that can be coupled across either of the bus contactors.

FIG. 3 depicts a configuration of a high-voltage power distribution system 300 for a vehicle including a plurality of contactors. The contactor module 342 may include a main contactor 306 that is configured to selectively electrically couple a positive terminal 222 of the traction battery 124 to a positive-side conductor 152A of the high-voltage load bus 152. The contactor module 342 may include a return contactor 308 that is configured to selectively electrically couple a traction battery return terminal 224 (return terminal of the traction battery 124) to a return-side conductor 152B of the high-voltage load bus 152. The contactor module 342 may include a precharge resistor 302 that can be selectively coupled across either of the main contactor 306 or the return contactor 308.

A first switch 304 may be coupled between the positive terminal 222 of the traction battery 124 and a first terminal of the precharge resistor 302. The first switch 304 may be an electromagnetic contactor. A first diode 322 may be coupled between the positive-side conductor 152A of the high-voltage load bus 152 and a second terminal of the precharge resistor 302. The first diode 322 may be arranged such that current flow is allowed from the precharge resistor 302 to the positive-side conductor 152A.

A second switch 310 may be coupled between the traction battery return terminal 224 and the first terminal of the precharge resistor 302. The second switch 310 may be an electromagnetic contactor. A second diode 324 may be coupled between the return-side conductor 152B of the high-voltage load bus and the second terminal of the precharge resistor 302. The second diode 324 may be arranged in the circuit such that current flow is allowed from the return-side conductor 152B to the precharge resistor 302.

The contactor module 342 may include a contactor controller 320 that is configured to operate and sequence the contactors and switches. Although depicted as part of the contactor module 342, the contactor controller 320 may be part of an external controller (e.g., system controller 148 or a traction battery controller). The contactor controller 320 may include a processor along with volatile and non-volatile memory. The contactor controller 320 may include hardware to interface with the contactors and switches. For example, the contactor controller 320 may include outputs that are configured to provide a voltage and current to contactor coils to energize the contactors.

The contactor module 342 may include a battery-side voltage sensing device 314 that is coupled between the terminals of the traction battery 124. The contactor module 342 may include a load-side voltage sensing device 316 that is coupled between the terminals of the high-voltage load bus 152. For example, the voltage sensing devices may be a resistive network that scales the voltage levels to be compatible with the contactor controller 320. The voltage sensing devices 314, 316 may also include circuitry for filtering the voltage signals and isolating the contactor controller 320 from high voltages. The contactor controller 320 may receive a signal from the battery-side voltage sensing device 314 that is indicative of the traction battery voltage. The contactor controller 320 may receive a signal from the load-side voltage sensing device 316 that is indicative of the high-voltage load bus voltage.

The precharge operation may be performed by operation of the first switch 304 and the second switch 310. Depending upon the state of the first switch 304 and the second switch 310, the precharge resistor 302 may be coupled across either the main contactor 306 or the return contactor 308. For example, to precharge when the main contactor 306 is open, the return contactor 308 is closed and the first switch 304 is closed to couple the precharge resistor 302 across the main contactor 306. Current from the traction battery 124 flows through the first switch 304, the precharge resistor 302, the first diode 322, the electrical load 218 and the return contactor 308. To precharge when the return contactor 308 is open, the main contactor 306 is closed and the second switch 310 is closed to couple the precharge resistor 302 across the return contactor 308. Current from the traction battery 124 flows through the main contactor 306, the electrical load 218, the second diode 324, the precharge resistor 302 and the second switch 310.

Figure 4:
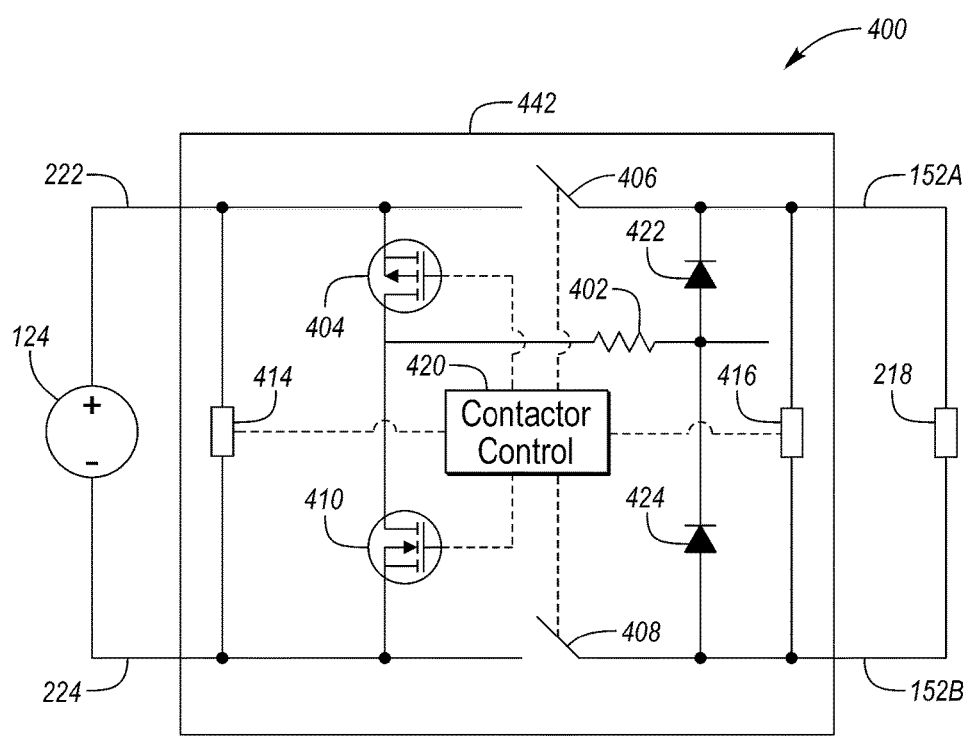
FIG. 4 depicts a possible configuration for a vehicle high-voltage system having a single precharge resistor that can be coupled across either of the bus contactors using solid-state switching devices.

FIG. 4 depicts a configuration of a high-voltage power distribution system 400 for a vehicle including a plurality of contactors. The contactor module 442 may include a main contactor 406 that is configured to selectively electrically couple a positive terminal 222 of the traction battery 124 to a positive-side conductor 152A of the high-voltage load bus 152. The contactor module 442 may include a return contactor 408 that is configured to selectively electrically couple a traction battery return terminal 224 (return terminal of the traction battery 124) to a return-side conductor 152B of the high-voltage load bus 152. The contactor module 442 may include a precharge resistor 402 that can be selectively coupled across either of the main contactor 406 or the return contactor 408.

A first solid-state switch 404 may be coupled between the positive terminal 222 of the traction battery 124 and a first terminal of the precharge resistor 402. The first solid-state switch 404 may be a p-channel metal oxide semiconductor field effect transistor (MOSFET). A first diode 422 may be coupled between the positive-side conductor 152A of the high-voltage load bus 152 and a second terminal of the precharge resistor 402. The first diode 422 may be arranged such that current flow is allowed from the precharge resistor 402 to the positive-side conductor 152A.

A second solid-state switch 410 may be coupled between the traction battery return terminal 224 and the first terminal of the precharge resistor 402. The second solid-state switch 410 may be a n-channel MOSFET. A second diode 424 may be coupled between the return-side conductor 152B of the high-voltage load bus and the second terminal of the precharge resistor 402. The second diode 424 may be arranged in the circuit such that current flow is allowed from the return-side conductor 152B to the precharge resistor 402. The MOSFETs may include an intrinsic diode that is not shown.

The contactor module 442 may include a contactor controller 420 that is configured to operate and sequence the contactors and solid-state switches. Although depicted as part of the contactor module 442, the contactor controller 420 may be part of an external controller (e.g., system controller 148 or a traction battery controller). The contactor controller 420 may include a processor along with volatile and non-volatile memory. The contactor controller 420 may include hardware to interface with the contactors and switches. For example, the contactor controller 420 may include outputs that are configured to provide a voltage and current to contactor coils to energize the contactors. The contactor controller 420 may include circuitry to provide a gate drive signal to the solid-state switches (404, 410).

The contactor module 442 may include a battery-side voltage sensing device 414 that is coupled between the terminals of the traction battery 124. The contactor module 442 may include a load-side voltage sensing device 416 that is coupled between the terminals of the high-voltage load bus 152. For example, the voltage sensing devices may be a resistive network that scales the voltage levels to be compatible with the contactor controller 420. The voltage sensing devices 414, 416 may also include circuitry for filtering the voltage signals and isolating the contactor controller 420 from high voltages. The contactor controller 420 may receive a signal from the battery-side voltage sensing device 414 that is indicative of the traction battery voltage. The contactor controller 420 may receive a signal from the load-side voltage sensing device 416 that is indicative of the high-voltage load bus voltage.

The precharge operation may be performed by operation of the first solid-state switch 404 and the second solid-state switch 410. Depending upon the state of the first solid-state switch 404 and the second solid-state switch 410, the precharge resistor 402 may be coupled across either the main contactor 406 or the return contactor 408. For example, to precharge with the main contactor 406 open, the return contactor 408 is closed and the first solid-state switch 404 is operated to couple the precharge resistor 402 across the main contactor 406. Current from the traction battery 124 flows through the first solid-state switch 404, the precharge resistor 402, the first diode 422, the electrical load 218, and the return contactor 408. To precharge with the return contactor 408 open, the main contactor 406 is closed and the second solid-state switch 410 is operated to couple the precharge resistor 402 across the return contactor 408. Current from the traction battery 124 flows through the main contactor 406, the electrical load 218, the second diode 424, the precharge resistor 402, and the second solid-state switch 410.

Certain aspects will be described with reference to the configuration depicted in FIG. 4. In addition, the features and functions described in relation to each of the configurations applies to each of the configurations and is not necessarily repeated. The concepts to be described are also applicable to the other configurations described herein. Note that the configurations described in the figures provide the capability to couple the precharge resistor across either the main contactor or the return contactor. The contactor controller 420 may be programmed to detect a contactor that is welded in the closed position. For example, the contactor controller 420 may be configured to detect that the main contactor 406 is closed even though it is commanded to be open Likewise, the contactor controller 420 may be configured to detect that the return contactor 408 is closed even though it is commanded to be open. Various techniques for detecting a welded contactor are available. Operation of the contactor module 424 as described is not limited to the particular scheme used for detecting a welded contactor.

A welded contactor may be detected by monitoring outputs of the battery-side voltage sensing device 414 and the load-side voltage sensing device 416. For example, the contactor controller 420 may receive or generate an open contactors request to isolate the traction battery 124 from the high-voltage load bus 152. During vehicle operation, both the main contactor 406 and the return contactor 408 are closed. In response to an open contactors request, the contactor controller 420 may command the main contactor 406 to open. After commanding the main contactor 406 to open, the traction battery voltage may be compared to the load-side voltage. The comparison may be performed a predetermined delay time after commanding the main contactor 406 to open to allow the load-side voltage to decay. If the difference between the traction battery voltage and the load-side voltage is greater than a predetermined amount, then the main contactor 406 is likely opened as commanded. If the load-side voltage is within a predetermined voltage range of the traction battery voltage, then the main contactor 406 is likely still closed. In this manner, a main contactor 406 that is welded shut may be detected. For example, if the load-side voltage did not decay (e.g., is approximately equal to the traction battery voltage) then the main contactor 406 is likely still closed.

In response to an open contactors request, the contactor controller 420 may command only the return contactor 408 to open. After commanding the return contactor 408 to open, the traction battery voltage may be compared to the load-side voltage. The comparison may be performed a predetermined delay time after commanding the return contactor 408 to open to allow the load-side voltage to decay. If the different between the traction battery voltage and the load-side voltage is greater than a predetermined amount, then the return contactor 408 is likely opened as commanded. If the load-side voltage is within a predetermined voltage range of the traction battery voltage, then the return contactor 408 is likely still closed. In this manner, a return contactor 408 that is welded shut may be detected. Other techniques may include circuitry configured to provide a resistance measurement across the main contactor 406 and the return contactor

408. For example, a high resistance value may be indicative of an open contactor, while a low resistance value may be indicative of a closed contactor.

The contactor controller 420 may monitor the rise time of the load-side voltage during a precharge operation. For example, during a precharge operation, the precharge resistor 402 may be coupled across the main contactor 406 in addition to closing the return contactor 408. A rate of change of the load-side voltage that is greater than a predetermined rise time may be indicative of a main contactor 406 that is shorted closed. An indication that the main contactor 406 and/or the return contactor 408 is shorted closed when commanded to be open may be stored in non-volatile memory for later use. In other configurations, a test for shorted contactors may be performed immediately prior to the precharge procedure.

In the event that the main contactor 406 or the return contactor 408 are shorted closed, the precharge operation may be altered. In response to a precharge request, the precharge resistor 402 may be coupled across the contactor that is not shorted closed. For example, if the main contactor 406 is shorted closed, the precharge resistor 402 may be coupled across the return contactor 408 to perform the precharge. As the precharge resistor 402 is coupled in the circuit, current flow is limited from the traction battery 124. The precharge operation may then be terminated using the normal precharge termination conditions. When the precharge is completed, the return contactor 408 may be closed and the precharge resistor 402 may be decoupled from the circuit.

If the return contactor 408 is shorted closed, the precharge resistor 402 may be coupled across the main contactor 406 to perform the precharge. As the precharge resistor 402 is coupled in the circuit, current flow is limited from the traction battery 124. The precharge operation may then be terminated using the normal precharge termination conditions. When the precharge is completed, the main contactor 406 may be closed and the precharge resistor 402 may be decoupled from the circuit.

By configuring the contactor module 442 to have multiple precharge paths, the precharge may be effected even when either one of the contactors is shorted closed. This prevents possible arcing in the contactor that is still operating normally and allows the vehicle to function normally. A diagnostic indication may be provided to indicate the shorted contactor condition. For example, a diagnostic message or lamp may be output to a display to inform the operator that the contactor module should be serviced soon.

Figure 5:
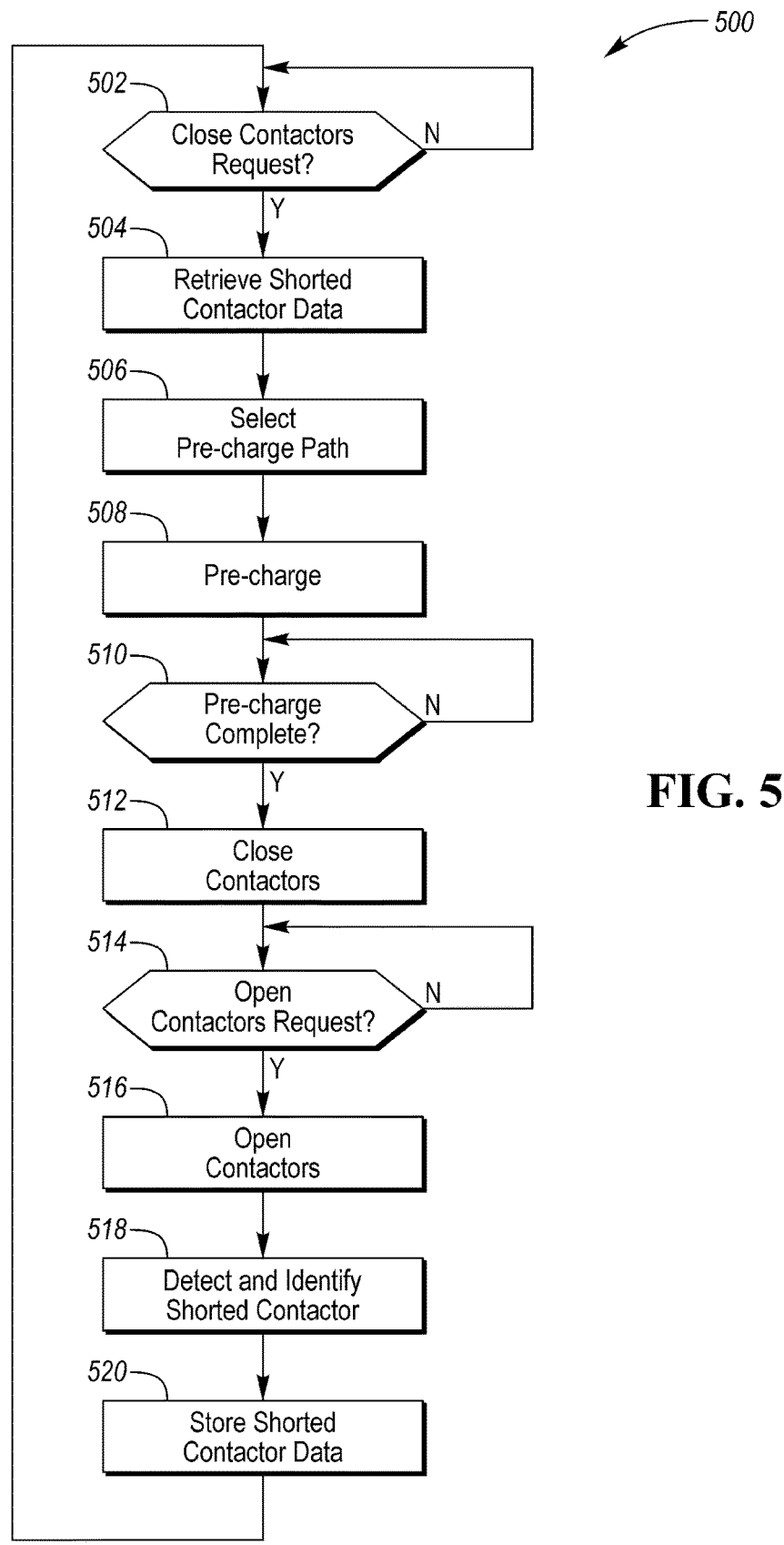
FIG. 5 depicts a flowchart for a possible sequence of operation for controlling the precharge operation of the high-voltage system.

FIG. 5 depicts a flowchart 500 for a possible sequence of operations that may be performed by a high-voltage bus precharge system that includes the contactor controller 420 for controlling operation of the contactors and switches. At operation 502, a check may be performed to determine if the contactors are to be closed. For example, a request to couple the traction battery 124 to the high-voltage load bus may be monitored. If no conditions for closing the contactors are present, operation 502 may be repeated. If conditions for closing the contactors are present, operation 504 may be performed.

At operation 504, data regarding shorted contactors may be retrieved. A contactor is shorted closed when the contactor is closed when commanded to be open. For example, previously performed diagnostic tests may store shorted contactor information in non-volatile memory. At operation 506, a precharge path may be selected based on the shorted contactor data. The precharge path may be defined as the contactor to be closed and the contactor across which the precharge resistor 402 is to be coupled. The precharge resistor 402 may be coupled across the contactor (e.g., main contactor 406 or return contactor 408) that is not shorted closed.

In addition, operation 506 may select the precharge path to minimize wear across the contactors. Even after the precharge operation, the contactors may be subject to current passing through the contactor during closing. The contactor controller 420 may be programmed to alternate coupling the precharge resistor 402 across the main contactor 406 and the return contactor 408. The contactor controller 420 may determine the precharge path for the most recent previous precharge cycle and alternate the precharge path for each precharge request. For example, the precharge resistor 402 may be coupled across the return contactor 408 in response to a precharge request that follows an immediately preceding precharge request that resulted in coupling the precharge resistor 402 across the main contactor 406. Similarly, the precharge resistor 402 may be coupled across the main contactor 406 in response to the precharge request that follows the immediately preceding precharge request that resulted in coupling the precharge resistor 402 across the return contactor 408. The immediately preceding precharge request refers to the most recent prior precharge request. The immediately preceding precharge request may have occurred in a previous ignition cycle. The contactor controller 420 may store information for each precharge cycle in non-volatile memory such that the information is available during subsequent operating cycles. In this manner, any arcing across the contactors is shared between the contactors.

At operation 508, the precharge operation may be performed. The precharge operation may include closing the selected contactor and operating the switches to couple the precharge resistor 402 in the selected path. The precharge operation may include monitoring voltage and currents during the precharge.

At operation 510, a check may be performed to determine if the precharge is completed. For example, the precharge may be completed when the load-side voltage is within a predetermined amount of the traction battery voltage. The precharge operation may be considered completed after expiration of a predetermined time interval. The predetermined time interval may be selected to prevent overheating of the precharge resistor. If the precharge is not complete, operations 508 and 510 may be repeated during the predetermined time interval. If the precharge is complete, operation 512 may be performed.

At operation 512, the main contactor 406 and the return contactor 408 may be both commanded to be closed. In addition, the precharge resistor 402 may be decoupled from the circuit such that the precharge resistor 402 is no longer in the current path by operation of the switches.

At operation 514, a check may be performed for an open contactors request. An open contactor request may result from an ignition off command. If there is no open contactor request, then operation 514 may be repeated. If there is an open contactor request, then operation 516 may be performed to open the contactors. Prior to opening the contactors, electrical loads 218 may be commanded to reduce current draw so that the main contactor 406 and the return contactor 408 open with a minimum current flowing. Operation 518 may be performed to detect and identify a shorted contactor. This may be performed as part of opening the contactors. For example, the opening of the contactors may be sequenced to detect a shorted contactor. The stored data may include an identification of the shorted contactor. At operation 520, shorted contactor data may be stored in non-volatile memory for later retrieval. Execution may then return to operation 502.

The configuration described herein provides options for precharging the power system in the event of a shorted contactor. The ability to precharge the system across both contactors reduces the possibility of arcing and welding on the properly functioning contactor. In addition, vehicle operation may be maintained in a presence of a faulted contactor without stranding the operator.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a precharge circuit configured to selectively couple a resistor across either a first or second contactor that are configured to selectively couple terminals of a battery to a load bus; and
   a controller programmed to, in response to a precharge request in a presence of the first contactor being closed when commanded to open and the second contactor being open, couple the resistor across the second contactor to precharge the load bus.

2. The vehicle of claim 1 wherein the controller is further programmed to, in response to the precharge request in a presence of the first contactor being open and the second contactor being closed when commanded to open, couple the resistor across the first contactor to precharge the load bus.

3. The vehicle of claim 1 wherein the precharge circuit comprises a first switching device configured to selectively couple the resistor between a positive terminal of the battery and a positive terminal of the load bus, and a second switching device configured to selectively couple the resistor between a negative terminal of the battery and a negative terminal of the load bus.

4. The vehicle of claim 3 wherein the first switching device is a p-channel metal oxide semiconductor field-effect transistor (MOSFET) and the second switching device is an n-channel MOSFET.

5. The vehicle of claim 3 wherein the precharge circuit further comprises a first diode coupled between the resistor and the positive terminal of the load bus and configured to flow current when the first switching device selectively couples the resistor, and a second diode coupled between the resistor and the negative terminal of the load bus and configured to flow current when the second switching device selectively couples the resistor.

6. The vehicle of claim 1 wherein the controller is further programmed to, in response to the precharge request in a presence of both the first contactor and the second contactor being open and following an immediately preceding precharge request that resulted in coupling the resistor across the first contactor, couple the resistor across the second contactor to precharge the load bus.

7. The vehicle of claim 1 wherein the controller is further programmed to, in response to the precharge request in a presence of both the first contactor and the second contactor being open and following an immediately preceding precharge request that resulted in coupling the resistor across the second contactor, couple the resistor across the first contactor to precharge the load bus.

8. A method comprising:
   coupling a resistor across a first contactor coupled between negative terminals of a battery and a load bus in response to a precharge request and a second contactor, coupled between positive terminals of the battery and the load bus, being shorted closed when commanded to open; and
   coupling the resistor across the second contactor in response to the precharge request and the second contactor being open.

9. The method of claim 8 further comprising coupling the resistor across the second contactor in response to the precharge request and the first contactor being shorted closed when commanded to open.

10. The method of claim 8 wherein coupling the resistor across the second contactor is further in response to the precharge request following an immediately preceding precharge request that resulted in coupling the resistor across the first contactor.

11. The method of claim 8 further comprising coupling the resistor across the first contactor in response to both the first contactor and the second contactor being open and the precharge request following an immediately preceding precharge request that resulted in coupling the resistor across the second contactor.

12. A vehicle comprising:
   a precharge circuit configured to selectively couple a resistor across either a first or second contactor that are configured to selectively couple terminals of a battery to a load bus; and a controller programmed to, in response to a precharge request that follows an immediately preceding precharge request that resulted in coupling the resistor across the first contactor, couple the resistor across the second contactor to precharge the load bus.

13. The vehicle of claim 12 wherein the controller is further programmed to, in response to the precharge request that follows the immediately preceding precharge request that resulted in coupling the resistor across the first contactor and the second contactor being closed when commanded to open, couple the resistor across the first contactor.

14. The vehicle of claim 12 wherein the controller is further programmed to, in response to the precharge request that follows the immediately preceding precharge request that resulted in coupling the resistor across the second contactor, couple the resistor across the first contactor to precharge the load bus.

15. The vehicle of claim 12 wherein the controller is further programmed to, in response to the precharge request that follows the immediately preceding precharge request that resulted in coupling the resistor across the second contactor and the first contactor being closed when commanded to open, couple the resistor across the second contactor.

16. The vehicle of claim 12 wherein the precharge circuit comprises a first switching device configured to selectively couple the resistor between a positive terminal of the battery and a positive terminal of the load bus, and a second switching device configured to selectively couple the resistor between a negative terminal of the battery and a negative terminal of the load bus.

17. The vehicle of claim 16 wherein the first switching device is a p-channel metal oxide semiconductor field-effect transistor (MOSFET) and the second switching device is an n-channel MOSFET.

18. The vehicle of claim 16 wherein the precharge circuit further comprises a first diode coupled between the resistor and the positive terminal of the load bus and configured to flow current when the first switching device selectively couples the resistor, and a second diode coupled between the resistor and the negative terminal of the load bus and configured to flow current when the second switching device selectively couples the resistor.

* * * * *